United States Patent
Neumann

(10) Patent No.: US 10,686,777 B2
(45) Date of Patent: Jun. 16, 2020

(54) METHOD FOR ESTABLISHING PROTECTED ELECTRONIC COMMUNICATION, SECURE TRANSFER AND PROCESSING OF INFORMATION AMONG THREE OR MORE SUBJECTS

(71) Applicant: ADUCID S.R.O., Brno-Prizrenice (CZ)

(72) Inventor: Libor Neumann, Praha-Luziny (CZ)

(73) Assignee: ADUCID S.R.O., Brno-Prizrenice (CZ)

( * ) Notice: Subject to any disclaimer, the term of this patent is extended or adjusted under 35 U.S.C. 154(b) by 137 days.

(21) Appl. No.: 15/737,698

(22) PCT Filed: Jul. 6, 2016

(86) PCT No.: PCT/CZ2016/050024
§ 371 (c)(1),
(2) Date: Dec. 18, 2017

(87) PCT Pub. No.: WO2017/005232
PCT Pub. Date: Jan. 12, 2017

(65) Prior Publication Data
US 2018/0183780 A1    Jun. 28, 2018

(30) Foreign Application Priority Data
Jul. 7, 2015    (CZ) ..................... 2015-472

(51) Int. Cl.
*G06F 21/10* (2013.01)
*H04L 29/06* (2006.01)
(Continued)

(52) U.S. Cl.
CPC .......... *H04L 63/0807* (2013.01); *G06F 21/10* (2013.01); *G06F 21/31* (2013.01);
(Continued)

(58) Field of Classification Search
CPC .......... G06F 21/10; G06F 21/31; G06F 21/32; H04L 63/18; H04L 9/3215; H04L 63/0807; H04L 63/0823
See application file for complete search history.

(56) References Cited

U.S. PATENT DOCUMENTS

2010/0095360 A1    4/2010   Pavlovski
2014/0095227 A1*   4/2014   Parker ................... G06Q 30/04
                                                    705/5

FOREIGN PATENT DOCUMENTS

CZ    2013-3733 A    6/2017
EP    2262164 A1    12/2010

OTHER PUBLICATIONS

International Search Report and Written Opinion for PCT/CZ2016/050024 filed Jul. 6, 2016.
(Continued)

*Primary Examiner* — Olugbenga O Idowu
(74) *Attorney, Agent, or Firm* — Notaro, Michalos & Zaccaria P.C.

(57) ABSTRACT

A method of establishing protected electronic communication, secure transfer and processing of information among three or more subjects in which, at first, a first secure authenticated channel is created using an authentication system between a first subject and a second subject, and this channel is used by the first subject, in co-operation with the second subject, to create an authentication object stored on the second subject and provided with authentication object methods, whereas the first subject configures methods of authentication object by assigning to each method of the authentication object a rights control information for at least one other subject and optionally also a rights control information for the first subject to use at least one method of the authentication object, and then the first secure authenticated channel is closed.

7 Claims, 7 Drawing Sheets

Figure 1:
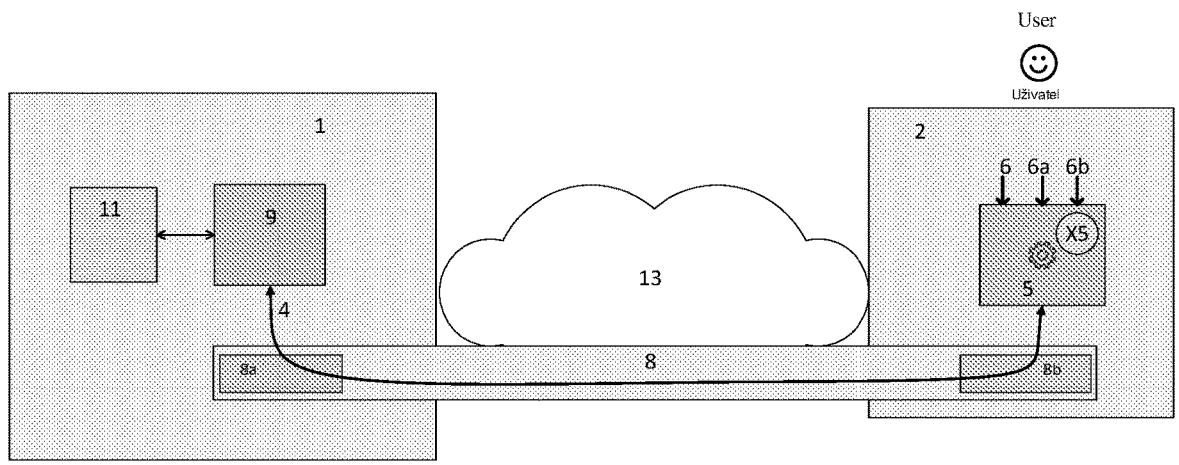

(51) Int. Cl.
  *H04L 9/32*   (2006.01)
  *H04W 12/06*  (2009.01)
  *G06F 21/31*  (2013.01)
  *G06F 21/32*  (2013.01)

(52) U.S. Cl.
  CPC ............ *G06F 21/32* (2013.01); *H04L 9/3215* (2013.01); *H04L 9/3231* (2013.01); *H04L 63/0823* (2013.01); *H04L 63/18* (2013.01); *H04W 12/06* (2013.01)

(56) References Cited

OTHER PUBLICATIONS

Menezes, Vnastone, Oorschot: Handbook of Applied Cryptography 1997, CRC Press LLC, USA.

\* cited by examiner

METHOD FOR ESTABLISHING PROTECTED ELECTRONIC COMMUNICATION, SECURE TRANSFER AND PROCESSING OF INFORMATION AMONG THREE OR MORE SUBJECTS

FIELD OF ART

The present invention provides a method of establishing protected electronic communication among three or more subjects including secure identification and verification of the subjects' identity in electronic communication, as well as secure procedures for transfer and processing of information in electronic communication among the three or more subjects, for both remote and local electronic communication, and combinations thereof.

BACKGROUND ART

Majority of known methods of protected electronic communication are destined for communication between two subjects—a service provider (relying party) and a service user. Establishing the protected electronic communication is directly related to the target system with which the electronic communication is established.

Use of a login name and a password is currently the most widespread method for establishing protected electronic communication.

Other methods for establishing protected electronic communication are those where several types of subjects are involved in establishing electronic communication. This includes, for example, Public Key Infrastructure (PKI) systems which involve, in addition to the user and the service provider (relying party), also a certification authority and, in some cases, a registration authority. The certification authority and, where appropriate, the registration authority are incorporated in the process of preparation of the environment for the protected electronic communication in that they verify the identity of the user and issue and electronically sign a certificate which is subsequently used by the service provider (relying party) and the service user for establishing protected electronic communication between them.

Another method for establishing protected electronic communication increasingly used is based on the principle of Federated Identity. This includes, for example, the SAML, oAuth, OpenId, and WS-federation standards. In this case, an additional subject is involved in the establishment of protected electronic communication—an identity provider. The basic method in the principle of Federative Identity is that the service user accessing the system of the service provider (relying party) is redirected to the system of the identity provider where authentication of the user is performed and, after the authentication process is completed, the user is redirected back to the system of the service provider (relying party). At the same time the identity provider informs the service provider (relying party) of the result of the user's authentication. A special feature of the HTTP protocol existing as a default part of standard web browsers (HTTP redirect) is used to redirect the user between the service provider (relying party) and the identity provider and back. The user is redirected only to perform the authentication. The transfer and processing of the target information takes place between two subjects—the service provider (relying party) and the user.

There are also other methods for establishing protected electronic communication: methods based on the existence of unique hardware tokens, multichannel methods using various, mutually more or less independent communication channels for establishing protected communication, as well as new, highly automated methods of establishing protected electronic communication which are described e.g. in patent application CZ PV 2013-373—Method of Authentication of Secure Data Channel.

Once the protected electronic communication is established between two subjects using any of the above methods or other known methods (hereinafter referred to as "authentication systems"), thus making the communication channel secure, the two subjects transfer information in a protected manner and, if applicable, further process the information in a protected manner.

Additionally, specialised systems or applications are known which allow for mutual communication among several subjects; these include teleconferences, social network systems, electronic payments, electronic tickets and public transport tickets, etc. Some of these systems also require protected electronic communication, exchange and processing of information whereas it is reliably ensured that only identifiable subjects and no one else is involved in the communication and that the communication is protected in all security elements (integrity, confidentiality, availability and non-repudiation).

Where these systems require protected communication, they use some of the known methods of establishing protected electronic communication between two subjects, i.e. always separately for each user and each provider. This causes certain complications.

In practice, the systems for establishing communication among several subjects are either acceptably simple for the user but do not provide enough security (e.g. repeated prompting to enter passwords), or they can provide the required level of security but are so complex for the user that most users are unable to handle them in practice (for example, PKI) and refuse to use them.

Yet, in practice, there is a wide range of situations where several subjects need to communicate with each other at once. At the same time, it is necessary in these situations to ensure a level of protection which is high but still manageable by most users. These situations include, for example, electronic fare systems in various types of public transport, confirmation and verification of identity in trade and banking such as online payments, transactions in public administration including cross-border communication, communication in health care services, etc.

DISCLOSURE OF THE INVENTION

The present invention provides a method for establishing protected electronic communication, secure transfer and processing of information among three or more subjects wherein all the subjects have an authentication system and in the first step, an authentication object is created and configured. The authentication object is an object specifically created and configured for a given purpose. The authentication object is subsequently employed using a specific method or combination of specific methods for establishing protected electronic communication and transferring and processing information among the three or more subjects.

Creation and Configuration of the Authentication Object

First of all, a first secure authenticated channel is created using the authentication system between a first subject (server) and a second subject (user device), through which the first subject, in co-operation with the second subject, creates an authentication object which is stored in the second subject and equipped with specific methods of the authentication object. The authentication object methods are set by the first subject by assigning the rights control information for at least one authentication object method of at least one other subject for the use of at least one authentication object method and optionally also the rights control information for at least one authentication object method of the first subject, and the first secure authenticated channel is then closed.

The authentication object can preferably contain internal data for future use (e.g. cryptographic signature keys, personal data, biometric data, information on prepaid fares or on other services).

The rights control information for each authentication object method are set by the first subject which has created the authentication object and has configured said authentication object by assigning to each authentication object method the information as to which subject, or group of subjects, is or is not permitted to use said authentication object method (i.e., rights control information).

The first subject is a server with which the other subjects communicate—for example, the first subject may be the server of the service provider (relying party).

The second subject is an electronic device used by the user. It can be a computer, a mobile phone, a tablet, a smartwatch, etc. Such a device provides a high level of certainty that there is no similar device that would be undistinguishable from the user device by electronic means; the device further supports a secure manner of creating or interconnecting other devices of the same user while ensuring that the devices can be distinguished by electronic means.

The authentication object method is a pre-set behaviour of the authentication object, and said pre-set behaviour changes depending on the input parameters used in the activation of the method.

Protected Simultaneous Communication Among Three or More Subjects

The first secure authenticated channel between the second subject and a third subject (e.g., another server) is created using the authentication system, the authentication object method activated by said first secure authenticated channel using the authentication system, wherein the second secure authenticated channel exists in parallel (i.e., at the same time) with the first secure authenticated channel and both channels are used for the subsequent secured transfer of information among all the subjects.

Using the authentication system, the authentication object method can create two or more secure authenticated channels between the second subject and two or more other subjects, whereas said channels exist in parallel with the first secure authenticated channel, and all such secure authenticated channels are used together for the subsequent secured transfer of information among all the subjects.

The third subject is a server, other than the first subject, with which the other subjects communicate.

Protected Communication Between Two Subjects Through a Third Subject with the Use of Local Communication The first subject creates a plurality of mutually independent authentication objects equipped with their respective authentication object methods, for the second subject and the fourth subject, and subsequently, using the authentication system, the second subject and the first subject create the first secure authenticated channel between themselves, which is used to activate the authentication object method of the second subject, said authentication object method in co-operation with the first subject prepares identity information destined for connecting the second subject with the fourth subject as well as security information intended for the subsequent secure protection of communication between the second subject and the fourth subject, where the identity information and the security information which is known only to the second subject are transferred from the second subject to the fourth subject. Subsequently a second secure authenticated channel is created between the first subject and the fourth subject using the authentication system, and the thus created second secure authenticated channel is connected with the first secure authenticated channel using identity information, whereby the security information becomes available to the first subject and is used for the subsequent secured transfer of information between the second subject and the fourth subject through the first subject.

Preferably, the identity information and the security information can be transferred from the second subject to the fourth subject using local communication.

The fourth subject is another device of the same user or another user.

Local communication is short-distance communication which excludes the possibility of the communicating subjects disclosing information to third parties or of the communication being intercepted.

Identity information is information which can be used to connect, within one subject, one secure authenticated channel with one or more other secure authenticated channels in such a way that the subjects connected by such secure authenticated channels are able to communicate among themselves.

Security information is information serving to establish secure electronic communication between two communicating subjects.

Activation of Authentication Object Method by Constant Local Electronic Communication Preferably, an activating information for local activation of the authentication object method is set within internal data for future use by the authentication object on the second subject during creating and configuring the authentication object and its methods (as described above in the method "Creation and configuration of authentication object"). The aforesaid method is subsequently activated by the second subject alone or by using local communication with another device possessing information which corresponds to the activating information in a pre-selected manner. After being activated, the authentication object method, using internal data intended for future use and using the authentication system, creates one or more secure authenticated data channels which are used for the subsequent secured transfer of information between the second subject and one or more other subjects based on the configuration of the authentication object.

Preferably, the information for activation of the authentication object method can be supplemented with information obtained during the local communication when activating the authentication object method.

Combination

To achieve the required functioning in the relevant specific use of the invention, it is especially advantageous to combine some or all of the preferred embodiments described herein.

For example, to achieve a "two service providers one user" topology, it is possible to use Protected simultaneous communication among three or more subjects.

For example, to achieve a "one service provider, two users" topology, it is possible to use Protected communication between two subjects through a third subject with the use of local communication.

For example, to achieve a "two providers, two users" topology, it is possible to use Protected simultaneous communication among three or more subjects as well as Protected communication between two subjects through a third subject with the use of local communication.

For example, to achieve the "one service provider, one user" topology, it is possible to use Activation of authentication object method by constant local electronic communication.

BRIEF DESCRIPTION OF THE FIGURES IN DRAWINGS

FIG. 1—Schematic depiction of the method Creation and configuration of authentication object according to examples of invention embodiment Nos. 1, 2, 3, 4, 5, 6, 7, 8, 9.

Figure 2:
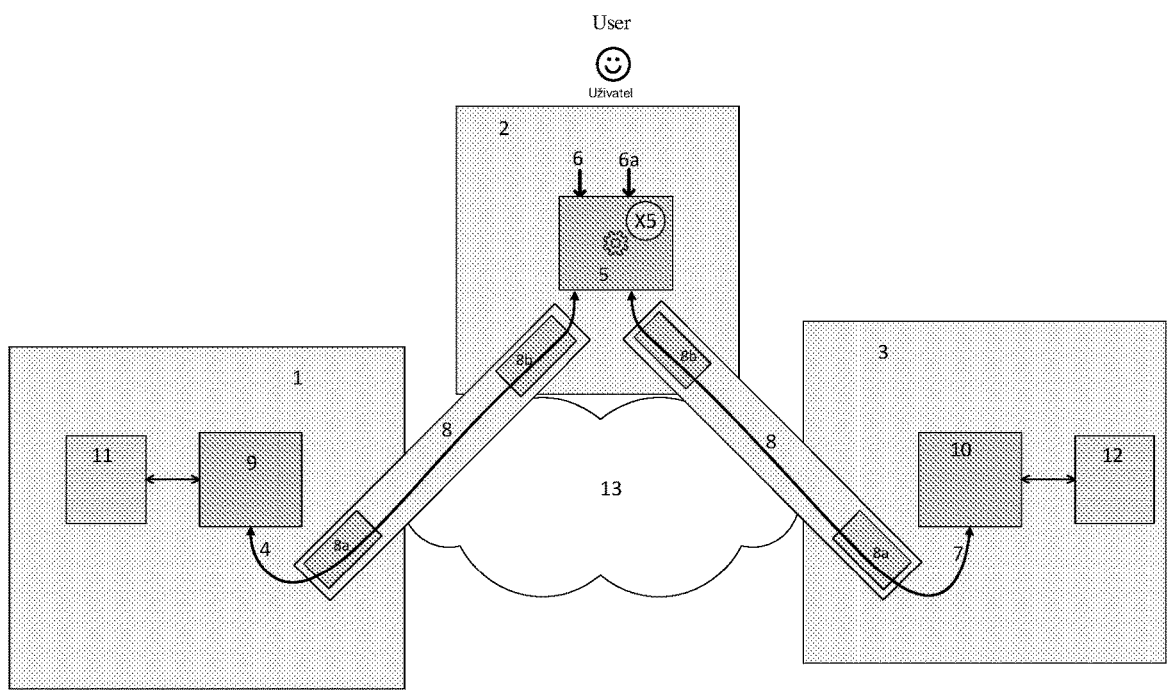

FIG. 2—Schematic depiction of the method Simultaneous communication among three or more subjects according to examples of invention embodiment Nos. 1, 6, 8.

Figure 3:
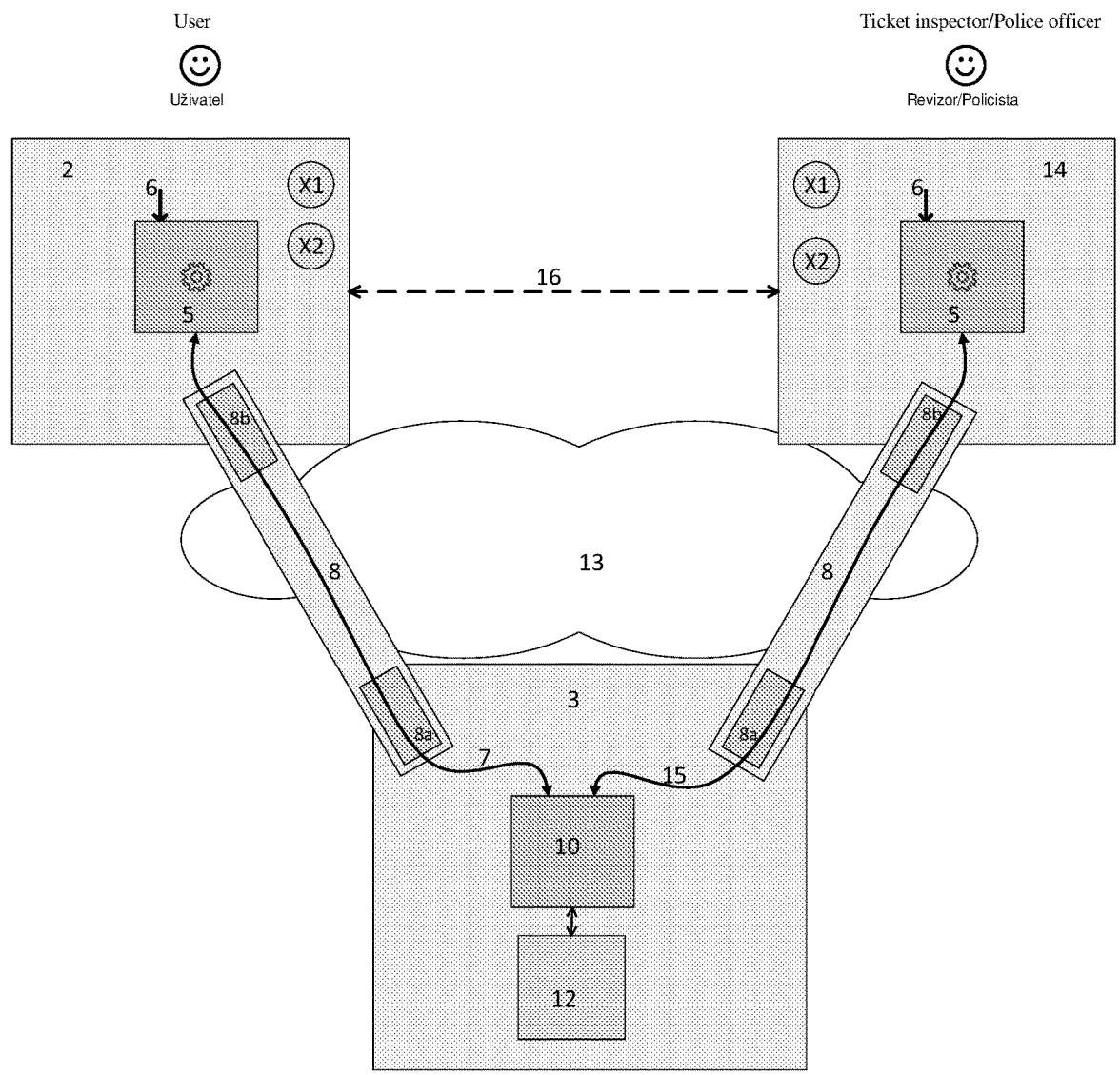

FIG. 3—Schematic depiction of the method Protected communication between two subjects through a third subject with the use of local communication according to example of invention embodiment No. 2.

Figure 4:
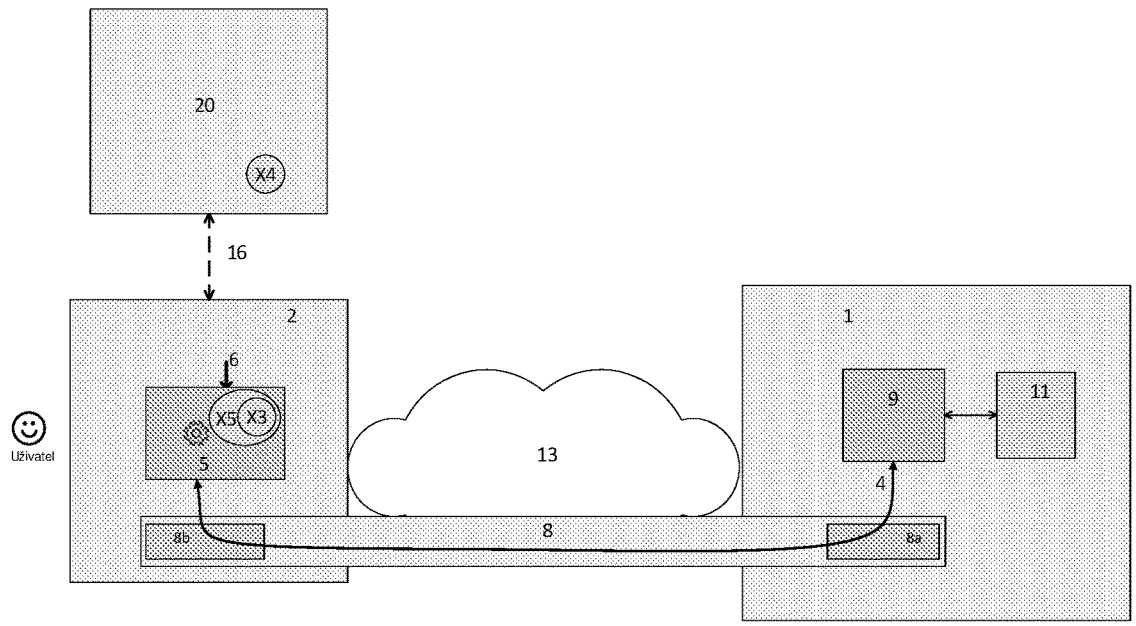

FIG. 4—Schematic depiction of the method Activation of personal object by constant local electronic communication according to examples of invention embodiment Nos. 5, 7.

Figure 5:
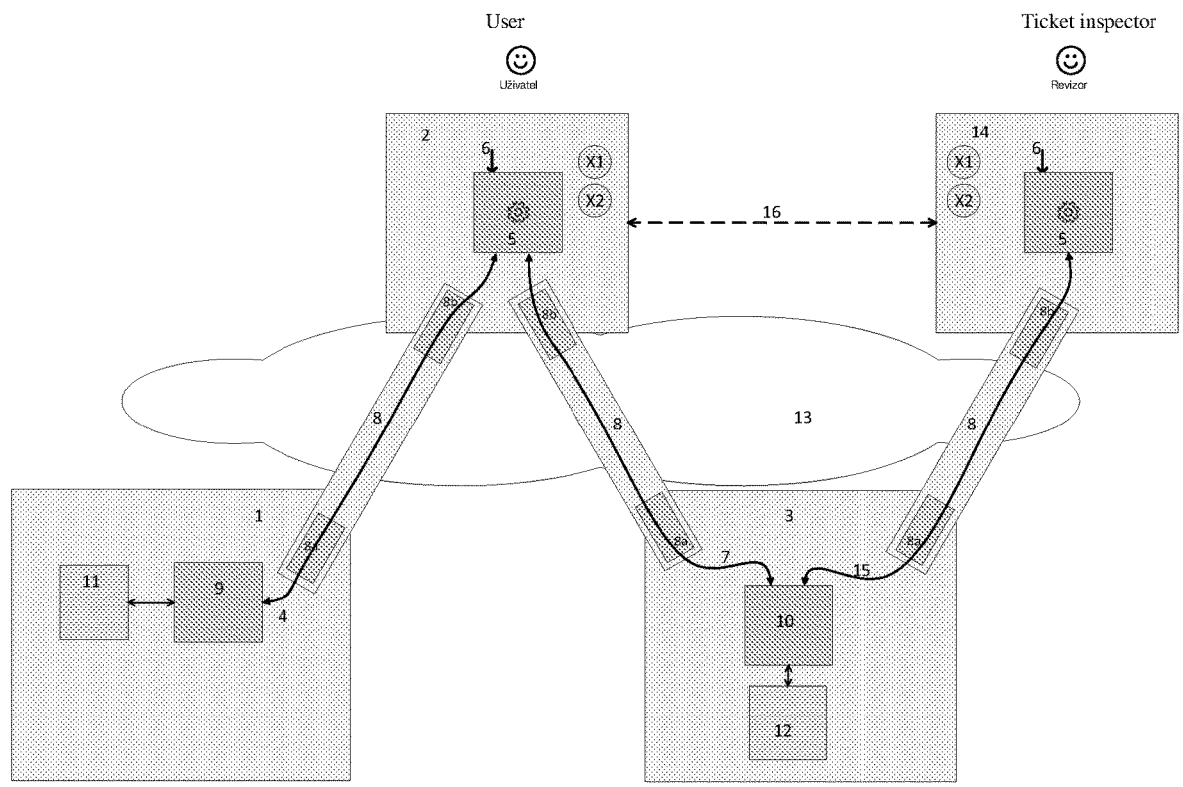

FIG. 5—Schematic depiction of the combination of methods Protected communication among three or more subjects and Local connection of two client systems in communication of three subjects according to example of invention embodiment No. 4.

Figure 6:
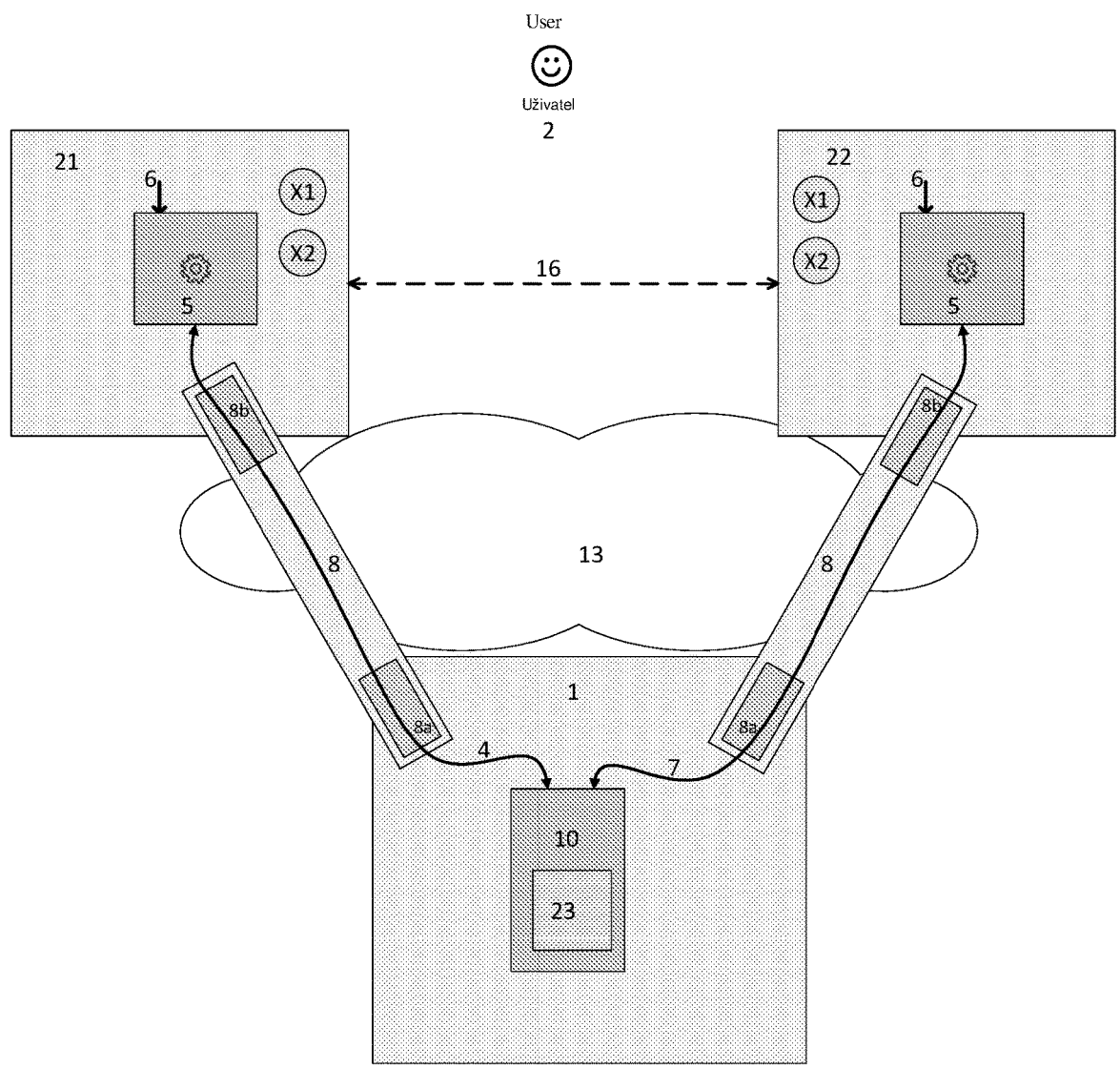

FIG. 6—Protected communication between two subjects through a third subject with the use of local communication according to example of invention embodiment No. 9.

Figure 7:
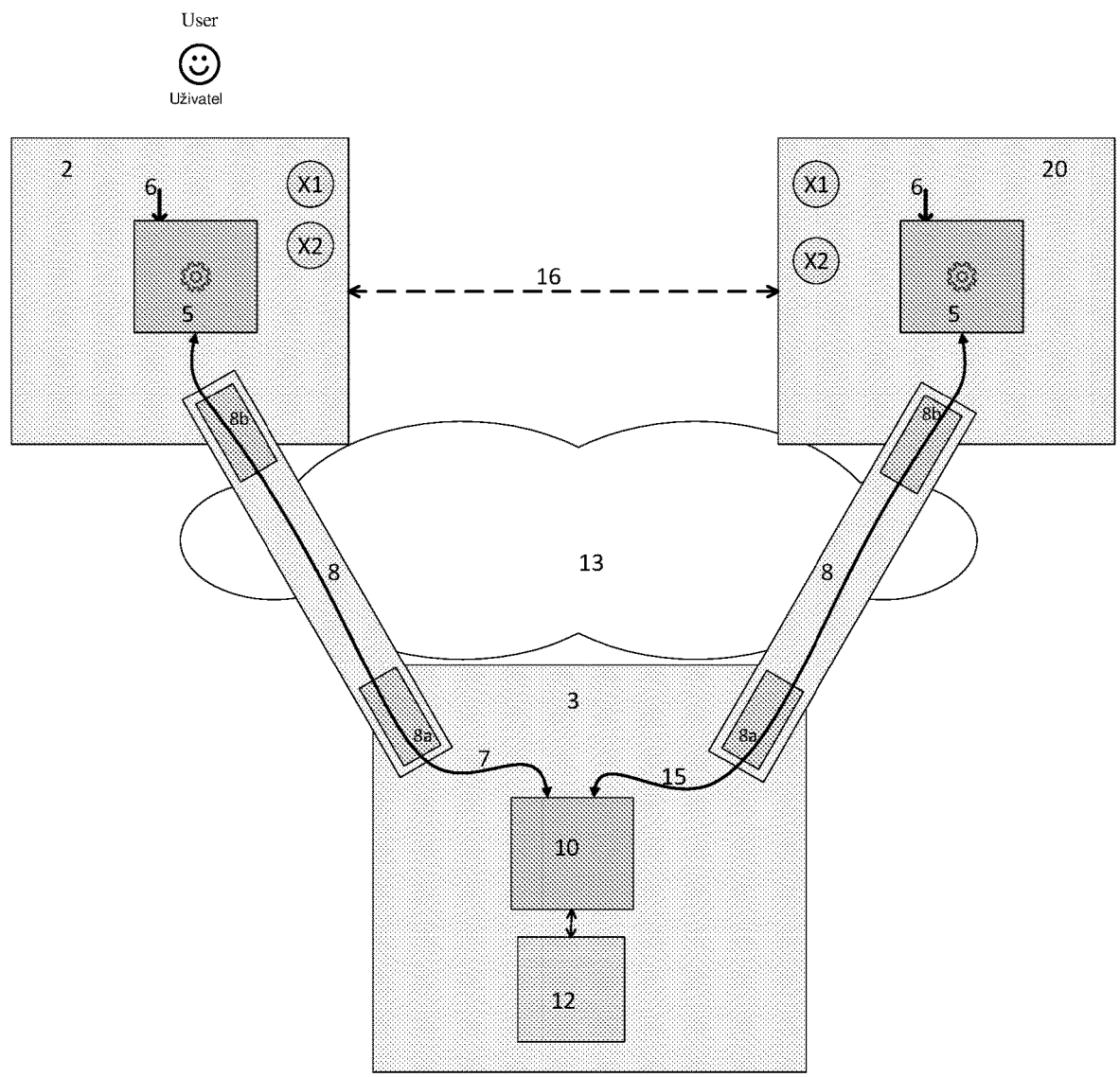

FIG. 7—Schematic depiction of the method Protected communication between two subjects through a third subject with the use of local communication according to example of invention embodiment No. 3.

Figure 8:
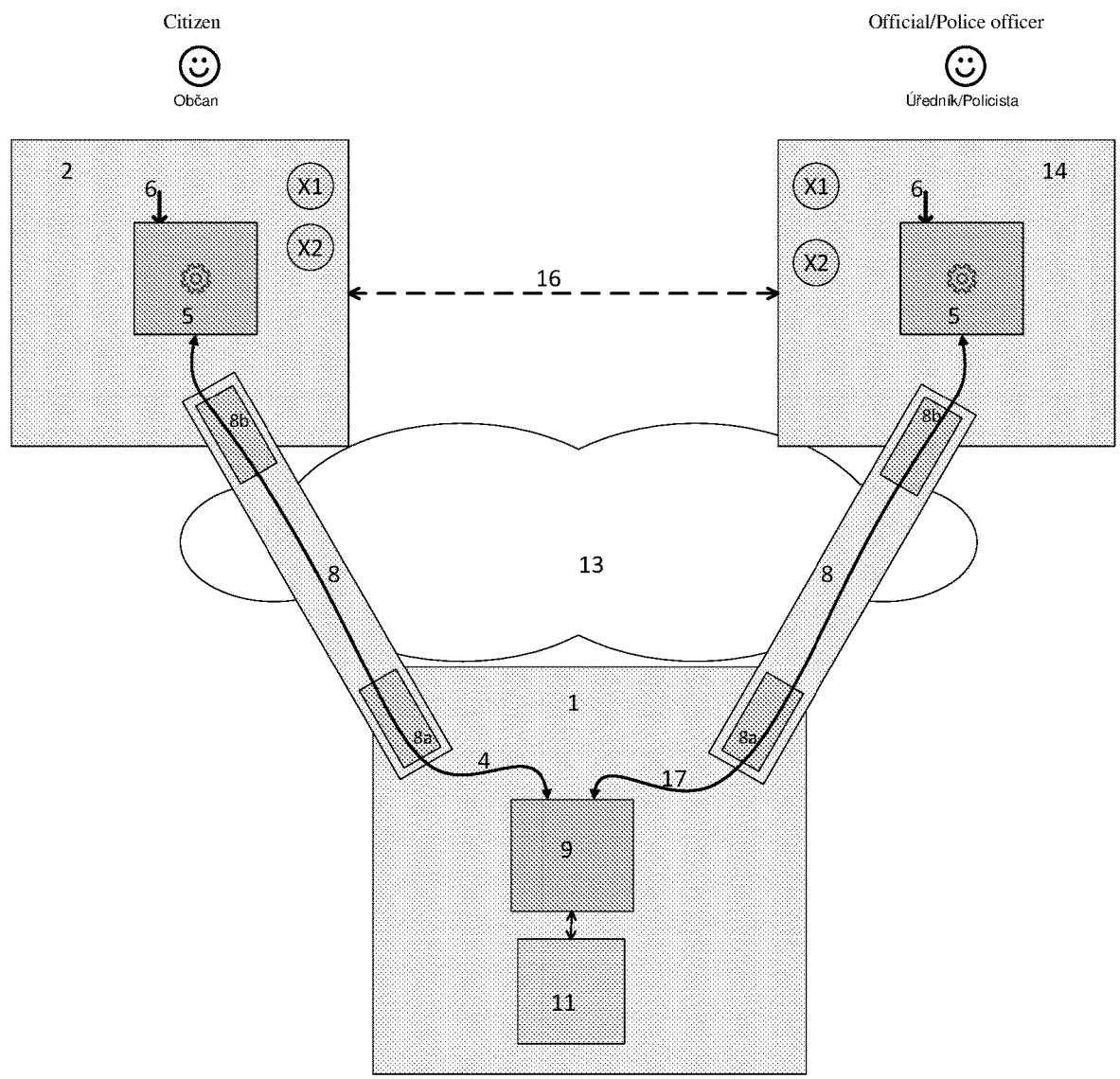

FIG. 8—Schematic depiction of the method Protected communication between two subjects through a third subject with the use of local communication according to example of invention embodiment No. 3.

Figure 9:
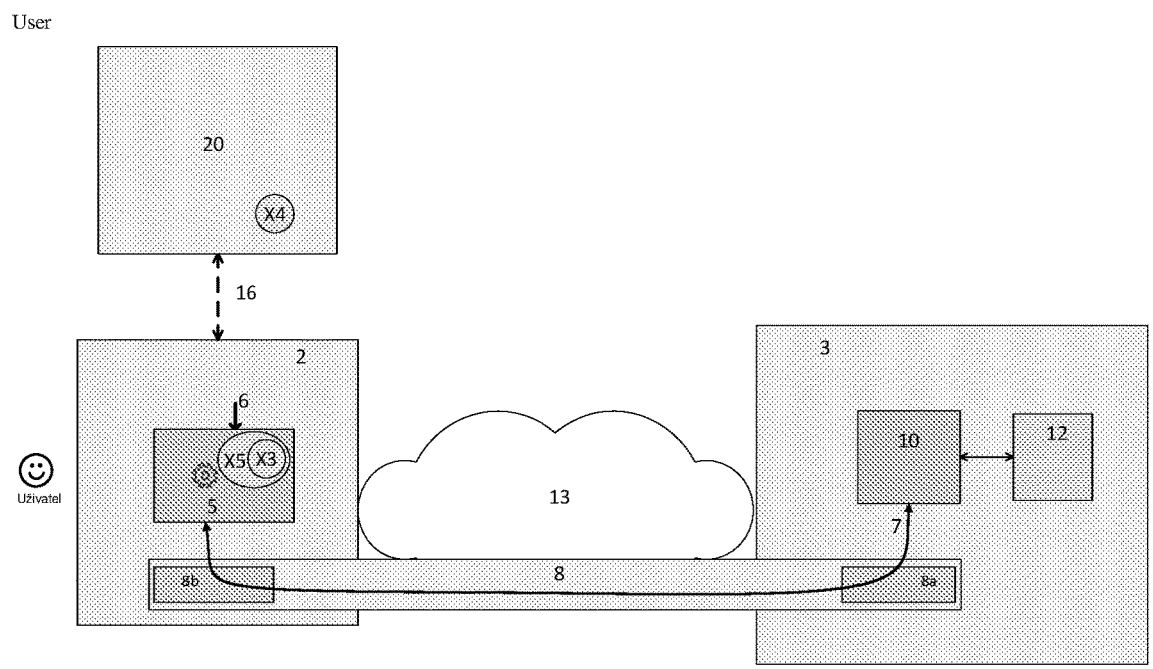

FIG. 9—Schematic depiction of the method Activation of personal object by constant local electronic communication according to examples of invention embodiment No. 2.

EXAMPLES OF CARRYING OUT THE INVENTION

Example 1—Payment Made Among Three Subjects

It uses the method "Creation and configuration of authentication object" and the method "Protected simultaneous communication between three or more subjects".
Re FIG. 1.

Second subject 2 ("user") together with First subject 1 ("bank") creates, using Authentication system 8 (which include Server part 8*a* of Authentication system 8 and Client part 8*b* of Authentication system First secure authenticated channel 4 between First subject 1 and Second subject 2. Using First secure authenticated channel 4, First subject 1 creates new Authentication object 5 ("payment module") on the device of Second subject 2. In the aforesaid Authentication object 5, it sets the rights control information for access to Methods 6 of Authentication object 5 by enabling the use of Method 6*a* ("pay") of Authentication object 5 for another subject (other subjects) ("vendor"). First subject 1 can further request, using Method 6*b* ("create cryptographic data") of Authentication object 5, the creation of cryptographic data, which are stored as part of internal data X5 for future use by Authentication object 5 for the purposes of confirming payment transactions. Then, First secure communication channel 4 between First subject 1 and Second subject 2 closed.
Re FIG. 2.

At the time when Second subject 2 is engaged in remote communication with Third subject 3 ("vendor") and wishes to make a payment, Second secure authenticated channel 7 is created using Authentication system 8 (which include Server part 8*a* of Authentication system 8 and Client part 8*b* of Authentication system between Second subject 2 and Third subject 3. By using the aforesaid Second secure authenticated channel 7, Third subject 3 requests activation of Method 6*a* of Authentication object 5 including transfer of the relevant parameters of the payment such as the amount paid, vendor's account, etc.

The request for payment in the form of request for activation of Method 6*a* of Authentication object 5 and the parameters of the payment are transferred, for example, from Information system 12 of Third subject 3 to Interface 10 of Authentication object 5 of Third subject 3 and further through Second secure authenticated channel 7 created between Third subject 3 and Second subject 2.

Second subject 2 evaluates the set access rules of Method 6*a* of Authentication object 5 for specific Third subject 3 and, in case of consistency, continues processing. In case of inconsistency of these rules, Second subject 2 denies to process the request for.

If the processing continues, Method 6*a* of Authentication object 5 creates, using Authentication system 8, First secure authenticated channel 4 between Second subject 2 and First subject 1, which exists in parallel with Second secure authenticated channel 7 between Second subject 2 and Third subject 3. Using First secure authenticated channel 4 and Interface of Authentication object 9 of First subject 1, messages required for entering and confirming the payment, including the required confirmation by the user and cryptographic operations using the previously created cryptographic material are transferred between Authentication object 5 and Information system 11 of First subject 1. After the payment is successfully made or denied by First subject 1 or Second subject 2, the result and any additional information are transferred using Second secure authenticated channel 7 between Second subject 2 and Third subject 3, for example to Information system 12 of Third subject 3 as a return message of the request for payment.
Re FIG. 1.

Over time, First subject 1 can use other Methods 6 of Authentication object 5 serving to further maintenance of payment Authentication object 5 such as creation of new cryptographic material including confirmation of succession using known cryptographic methods. In this process, it can use Interface of Authentication objects 9 of First subject 1, First secure authenticated channel 4 created, using Authentication system 8, Methods 6 of Authentication object 5 on the device of Second Subject 2 and the rights control information for Methods 6 of Authentication object 5.

Communication between the subjects takes place using Common network 13 which needs not be secured, e.g. using the Internet.

Example 2—Anonymous Public Transport Tickets

It uses the method "Creation and configuration of authentication object" and the method "Activation of authentication object method by constant local electronic communication".

Re FIG. 2.

Second subject 2 ("passenger") purchases a digital anonymous ticket from Third subject 3 ("transport company"), for example using the procedure according to example 1. The purchase of the ticket results in Authentication object 5 ("ticket") of Second subject 2 ("passenger") and, if applicable, other internal data X5 for future use, for example ticket identification, tariff, price, validity, etc. in Information system 12 of Third subject 3 ("transport company").

Information system 12 of Third subject 3 ("transport company") also sets the access rights to Methods 6 of Authentication object 5 ("ticket") of Second subject 2 ("passenger") according to its needs and in accordance with the legal regulations and the methods of activation of Methods 6 of Authentication object 5 ("ticket") using Local communication 16 (FIG. 3, FIG. 4).

Re FIG. 9.

In case of input control by Other subject 20 e.g. using a device such as entry gate to a means of transport (e.g. a turnstile), Obtained information X4 is passed over by Local communication 16 between Other subject 20 and Second subject 2 e.g. by displaying the QR code on the entry gate and reading the QR code using the device of Second subject 2. If Obtained information X4 corresponds to Activating information X3, Method 6 is activated ("verify fare by entry gate static identifier") of Authentication object 5.

Method 6 ("verify fare by entry gate static identifier") of Authentication object 5 ("ticket") creates Second secure authenticated channel 7 using Authentication system 8 between Second subject 2 and Third subject 3, and using the aforesaid Second secure authenticated channel 7 and Interface 10 of Authentication objects 5 of Third subject 3, fare is verified by Method 6 ("verify fare by entry gate static identifier") of Authentication object 5 ("ticket") of Second subject 2 ("passenger") in co-operation with Information system 12 of Third subject 3 ("transport company").

Re FIG. 3.

In case of fare inspection by Fourth subject 14 ("ticket inspector"), Second subject 2 ("passenger"), using the device of Second subject 2 and Local communication 16 between the device of Second subject 2 ("passenger") and the device of Fourth subject 14 ("ticket inspector"), transmits identity information X1 using Method 6 ("fare verification by ticket inspector") of Authentication Object 5 ("ticket"), e.g. in such a way that the device of Second subject 2 ("passenger") displays a QR code containing the unique ticket number. The device of Second subject 2 ("passenger") is used in relation to the device of Fourth subject 14 ("ticket inspector") as if it was Other subject 20 (re FIG. 4).

Using the device of Fourth subject 14, which contains Authentication object 5 ("verification") of Fourth subject 14 previously established by Third subject 3 ("transport company") ((for example, established by Information system 12 of Third subject 3 ("transport company") earlier in the process of establishment of the contractual relationship between the transport company and the ticket inspector, e.g. as part of training and verifying the employee's knowledge)), Fourth subject 14 ("ticket inspector") reads Obtained information X4 from the device of Second subject 2 ("passenger") and, using Method 6 of Authentication object 5 ("verify fare by ticket inspector") of Fourth subject 14, transmits information to Information system 12 of Third subject 3 ("transport company") for verification. To this end, it uses Third Secure Authenticated Channel 15 created using Authentication System 8 and Interface 10 of Authentication Objects 5 of Third subject 3. Following this, it receives the result of the verification and, if applicable, other required information from Information system 12 of Third subject 3 ("transport company") using Third secure authenticated channel 15.

Example 3—Personified Public Transport Tickets

It uses the method "Creation and configuration of authentication object" and the method "Protected communication between two subjects through a third subject with the use of local communication".

Re FIG. 2.

Second subject 2 ("passenger") purchases a digital ticket from Third subject 3 ("transport company"); the ticket is not transferable. Personal data are used in this process, e.g. photographs or other biometric data which the transport company must not keep for statutory or other reasons or does not wish to keep them in any of its information systems, including Information system 12 of Third subject 3 ("transport company"). The purchase transaction can take place following example 1, with the possibility of incorporating the procedure of personal data verification.

The result of the above mentioned process is an existing electronic ticket kept within Authentication object 5 ("ticket") of Second subject 2 ("passenger") and in Information system 12 of Third subject 3 ("transport company") and other attached internal data X5 for future use such as tariff, price, validity etc. as well as personal data serving to identify the user during verification of travel tickets, for example biometric data such as a photograph which are kept only in Authentication object 5 ("ticket") of Second subject 2 ("passenger") and can be cryptographically secured against modification e.g. through the electronic signature of Third subject 3 ("transport company").

Re FIG. 3.

In case of fare verification by Fourth subject 14 ("ticket inspector") of Second subject 2 ("passenger"), Fourth subject 14 ("ticket inspector) by usual means establishes protected electronic communication with Third subject 3 ("transport company") using Authentication system 8 between Fourth subject 14 and Third subject 3 and creates Third secure authenticated channel 15. Third secure authenticated channel 15 is used to activate Method 6 ("biometric verification") of Authentication object 5 ("verification") of Fourth subject 14 previously established by Third subject 3 ("transport company) (established similar to Example 2) provided that the right to use it is configured.

Method 6 ("biometric verification") of Authentication object 5 ("verification") of Fourth subject 14 inter alia prepares, in co-operation with Interface 10 of Authentication objects 5 of Third subject 3, Identity information X1 and Security information X2 intended for interconnection with the device of the subject being verified, i.e. Second subject 2 ("passenger").

The device of Fourth subject 14 ("ticket inspector"), in co-operation with the device of Second subject 2 ("passenger") and Local communication 16 between the device of Second subject 2 ("passenger") and the device of Fourth subject 14 ("ticket inspector") transmits Identity information X1 and Security information X2 e.g. in that the device of Fourth subject 14 ("ticket inspector") displays the QR code using Authentication object 5 ("verification") and Second subject 2 ("passenger") reads the information containing Identity information X1 and Security information X2 using the device of Second subject 2 ("passenger") from the device of Fourth subject 14 ("ticket inspector").

The device of Second subject 2 ("passenger") uses Identity information X1 for establishing protected electronic communication with Third subject 3 ("transport company") using Authentication system 8 between the device of Second subject 2 and the device of Third subject 3 and establishes Second secure authenticated channel 7. Method 6 ("biometric verification by ticket inspector") of Authentication object 5 ("ticket") of Second subject 2 ("passenger") is activated using Second secure authenticated channel 7.

Second secure authenticated channel 7 and Third secure authenticated channel 15 in the device of Third subject 3 ("transport company") are interconnected using Identity information X1. Security information X2 that was not transferred either from the device of Second subject 2 ("passenger"), or from the device of Fourth subject 14 ("ticket inspector") can be used for ensuring security, especially confidentiality of the data transfer between the device of Second subject 2 ("passenger") and the device of Fourth subject 14 ("ticket inspector").

Using Method 6 ("biometric verification") of Authentication object 5, Fourth subject 14 ("ticket inspector") verifies internal data X5 for future use obtained through co-operation with Method 6 ("biometric verification by ticket inspector") of Authentication object 5 ("ticket") of Second subject 2 ("passenger") and with Information system 12 of Third subject 3 ("transport company"), including the use of secured transfer of biometric data required for verification from the device of Second subject 2 ("passenger"), e.g. a photograph signed by the transport company earlier, at the time of ticket purchase.

In the process, the ticket inspector can carry out the relevant verifications by comparing the biometric data with reality, e.g. to compare the face of the person being checked and his/her photograph.

Re FIG. 7.

In case of input control e.g. at the entry gate to a means of transport equipped with means of verification of biometric data, Local communication 16 transmits Identity information X1 and Security information X2 between Other subject 20 ("transport company device") and the device of Second subject 2, e.g. by the entry gate displaying the QR code and by the device of Second subject 2 reading the QR code. Other subject 20 ("transport company's device") is used in relation to the device of Second subject 2 ("passenger") as if it was a device of Fourth subject 14, i.e. in a manner analogous to that described in the preceding text.

Internal data X5 for future use, e.g. biometric data passed over from the device of Second subject 2 ("passenger") to Other subject 20, e.g. to the entry gate of the means of transport equipped with means of verification of biometric data, are used, after verifying authenticity, for verification of the actually obtained biometric data, e.g. obtained face image.

In the process, Other subject 20 ("transport company device") can also co-operate with Information system 12 of Third subject 3 ("transport company") and use the results of authentication of the device of Second subject 2 ("passenger") carried out in the creation of Second secure authenticated channel 7 and also internal data X5 for future use stored in Authentication object 5 ("ticket").

Example 4—Issue and Verification of Personal Electronic ID Card or Certificate

It uses the method "Creation and configuration of authentication object", the method "Protected simultaneous communication among three or more subjects" and the method "Protected communication between two subjects through a third subject with the use of local communication".

Re FIG. 8.

Second subject 2 ("citizen") obtains an identification card or some other card (qualification, membership, etc.) from First subject 1 ("issuing institution") on the basis of the relevant verification process, e.g. verification of citizenship, verification of the relevant qualification (e.g. driving license) or compliance with some other conditions (e.g. a card proving the existence of health or social insurance, membership card).

The card in electronic form is realized as Authentication object 5 ("card") of Second subject 2 ("citizen") within the following process: the device of Second subject 2 ("citizen") together with the device of First subject 1 ("issuing organisation") creates, using Authentication system 8, First secure authenticated channel 4 between First subject 1 and Second subject 2. Using First secure authenticated channel 4, First subject 1 ("issuing organisation") creates new Authentication object 5 ("card") of Second subject 2 ("citizen"), including determination of access rights to Methods 6 of Authentication object 5.

The personal data and biometric data required for the subsequent verification as part of internal data X5 for future use are stored in Authentication object 5 ("card") on the device of Second subject 2 ("citizen") and can be cryptographically secured against unauthorised use, (for example against modification) through electronic signature of First subject 1 ("issuing institution").

In the process of verification of accuracy and correctness of the data at the time when they are issued by an officer of First subject 1 ("issuing institution"), i.e. by Fourth subject 14 ("officer"), the aforesaid Fourth subject 14 ("officer") by usual means establishes protected electronic communication with the device of First subject 1 ("issuing institution") using Authentication system 8 between Fourth subject 14 ("officer") and First subject 1 ("issuing institution") and establishes Fourth secure authenticated channel 17. Method 6 ("verified issue of card") of Authentication object 5 ("issue of cards") of Fourth subject 14 ("officer") previously established by First subject 1 ("issuing institution") (which was established e.g. at the time of appointment of the officer) is activated using Fourth secure authenticated channel 17, provided that the right to use Method 6 ("verified issue of card") of Authentication object 5.

Following this, the device of Second subject 2 ("citizen"), together with the device of First subject 1 ("issuing institution"), creates First secure authenticated channel 4 between First subject 1 and Second subject 2 using Authentication system 8. Using First secure authenticated channel 4, First subject 1 ("issuing institution") creates new Authentication object 5 ("card") on the device of Second subject 2 ("citizen"). In the aforesaid Authentication object 5, it configures the rights control information for access to Authentication object methods 6 by enabling the use of Method 6 ("verify identity") of Authentication object 5 for other subjects ("verifying institutions").

Following this, using Method 6 ("create Identity information X1 for issue") of Authentication object 5, First subject 1 ("issuing institution") requests creation of unique Identity information X1 and Security information X2 by Authentication object 5 ("card") on the device of Second subject 2 ("citizen") for the purposes of interconnection with Fourth subject 14 ("official") in issuing a card with verification.

The device of Fourth subject 14, in co-operation with the device of Second subject 2 and Local communication 16 between the device of Second subject 2 ("citizen") and the device of Fourth subject 14 ("official") transmits Identity information X1 and Security information X2 e.g. in that the device of Second subject 2 ("citizen") displays the QR code using Authentication object 5 ("create Identity information X1 for issue"), and the device of Fourth subject 14 ("official") reads Identity information X1 and Security information X2.

The device of Fourth subject 14 ("official") uses the aforesaid Identity information X1 and Security information X2 as an input for Method 6 ("verified issue of card") of Authentication object 5 ("issue of cards") of Fourth subject 14 ("official").

First secure authenticated channel 4 and Fourth secure authenticated channel 17 on the device of First subject 1 ("issuing institution") are interconnected using Identity information X1. Security information X2 that was not transferred from the device of Second subject 2 ("citizen") and from the device of Fourth subject 14 ("official") can be used for ensuring security, especially confidentiality of the data transfer between the two devices.

Using Method 6 ("verified issue of card") of Authentication object 5, in co-operation with Method 6 ("card record") of Authentication object 5 ("card") of Second subject 2 ("citizen") and in co-operation with Information system 11 of First subject 1 ("issuing institution"), Fourth subject 14 ("official") records verified information including the secured transfer of biometric data on the device of Second subject 2 ("citizen"), e.g. digital photograph, fingerprints in data format, identification data from the card, security features, information on validity.
Re FIG. 3.

In case of verification by a natural person, for example identity check by Fourth subject 14 ("police officer") of Second subject 2 ("citizen"), Fourth subject 14 ("police officer") establishes by usual means protected electronic communication with Third subject 3 ("police") using Authentication system 8 between Third subject 3 and Fourth subject 14 and creates Third secure authenticated channel 15. Third secure authenticated channel 15 is used to activate Method 6 ("biometric verification") of Authentication object 5 ("verification") of Fourth subject 14 ("police officer") previously established by Third subject 3 ("police"), provided that the right to use Method 6 ("biometric verification") of Authentication object 5 is configured.

Method 6 ("biometric verification") of Authentication object 5 inter alia prepares Identity information X1 and Security information X2 intended for interconnection with the device of the subject being verified, i.e. Second subject 2 ("citizen").

The device of Fourth subject 14, in co-operation with the device of Second subject 2 and Local communication 16 between the device of Second subject 2 ("citizen") and the device of Fourth subject 14 ("police officer"), transfers Identity information X1 and Security information X2 e.g. in a way that the device of Fourth subject 14 ("police officer") displays the QR code using Authentication object 5 ("verification") and Second subject 2 ("citizen") reads the information using the device of Second subject 2 ("citizen") from the device of Fourth subject 14 ("police officer").

The device of Second subject 2 ("citizen") uses the aforesaid Identity information X1 for establishing protected electronic communication with Third subject 3 ("police") using Authentication system 8 between Second subject 2 and Third subject 3 and establishes Second secure authenticated channel 7. Method 6 ("biometric verification by police officer") of Authentication object 5 ("card") of Second subject 2 ("citizen") is activated after verifying the access rights of Third subject 3 ("police") and Fourth subject 14 ("police officer") using Second secure authenticated channel 7.

Second secure authenticated channel 7 and Third secure authenticated channel 15 are interconnected using Identity information X1. Security information X2 that was not transferred from the device of Second subject 2 ("citizen") and from the device of Fourth subject 14 ("police officer") can be used for ensuring security, especially confidentiality of the data transfer between the device of Second subject 2 ("citizen") and the device of Fourth subject 14 ("police officer").

Using Method 6 ("biometric verification") of Authentication object 5 ("verification"), Fourth subject 14 ("police officer") verifies the information obtained through co-operation with Method 6 ("biometric verification by police officer") of Authentication object 5 ("card") of Second subject 2 ("citizen") and, in co-operation with Information system 12 of Third subject 3 ("police") including secured transfer of biometric data required for verification from the device of Second subject 2 ("citizen"), e.g. photograph signed by First subject 1 ("issuing institution") earlier, at the time of issuing the card (re FIG. 8), performs verification e.g. by comparing the face of the citizen being checked with the photograph obtained from the electronic card and by verifying intactness of the data and validity of the card.
Re FIG. 5.

In the process of verification, it is also possible to use communication between Information system 11 of First subject 1 ("issuing institution") and Information system 12 of Third subject 3 ("police") through usual means of communication between information systems.
Re FIG. 7.

In case of automated verification of the physical identity of a citizen (for example, entry gate in buildings, automated border control) by Third subject 3 ("verifying institution") equipped with Other subject 20 ("verifying device") with means for verification of biometric data, Local communication 16 transmits Identity information X1 and Security information X2 between Other subject 20 and the device of Other subject 2 ("citizen"), e.g. in a way that the entry gate displays the QR code and the QR code is read using the device of Second subject 2 or using a wireless sensor. Other subject 20 ("verifying device") is used in relation to the device of Second subject 2 ("citizen") as if it was a device of Fourth subject 14, i.e. in a manner analogous to that shown in Example 3.

Second secure authenticated channel 7 is created based on Identity information X1 and Security information X2 transmitted from Other subject 20 ("verification device") to the device of Second subject 2 ("citizen") using Authenticated system 8 between Second subject 2 ("citizen") and Third subject 3 ("verifying institution") and, using the aforesaid Second secure authenticated channel 7, Third subject 3 ("verifying institution") requests Method 6 ("biometric verification of identity") of Authentication object 5 ("card") to be activated and performed including transmitting any relevant parameters, such as a required biometric element (photograph, fingerprint, etc.).

If the relevant rights for activating and performing Method 6 ("biometric verification of identity") of Authentication object 5 ("card") for Third subject 3 ("verifying institution") are set, Method 6 ("biometric verification of identity") of Authentication object 5 ("card") communicates with Information system 12 of Third subject 3 using Second secure authenticated channel 7.
Re FIG. 5.

Information system 12 of Third subject 3, possibly in co-operation with Information system 11 of First subject 1 ("issuing institution") achieved through normal means of communication between information systems, performs verification of the relevant data (for example, verification of intactness and validity of data), including verification of consistency of biometric data.

The biometric data transmitted from the device of Second subject 2 ("citizen") to Other subject 20 ("verifying device"), e.g. to the system of automated border control equipped with means for verification of biometric data, are after their authentication used for verification of the actually obtained biometric data, e.g. obtained face image or obtained fingerprints.

During this process, Other subject 20 ("verifying device") can also co-operate with Information system 12 of Third subject 3 ("verifying institution") as well as Information system 11 of First subject 1 ("issuing institution") and use the results of authentication of the device of Second subject 2 ("citizen") and information stored in Authentication object 5 ("card").
Re FIG. 5.

It is also possible, on the basis of Identity information X1 and Security information X2 transferred from Other subject 20 ("verifying device") to the device of Second subject 2 ("citizen"), to simultaneously create First secure authenticated channel 4 using Authentication system 8 used between Second subject 2 ("citizen") and First subject 1 ("issuing organisation") and, using the aforesaid First secure authenticated channel 4, Other subject 20 or Information system 12 of Third subject 3 ("verifying institution") can communicate with Information system 11 of First subject 1 ("issuing institution").

Example 5—Passive Validator—Entry Gates, Proving Presence, Ticket Validation

It uses the method "Creation and configuration of authentication object" and the method "Activation of authentication object method by constant local electronic communication".
Re FIG. 1.

Using Authentication system 8 (which includes Server part 8a of Authentication system 8 and Client part 8b of Authentication system 8) Second subject 2 ("user") together with First subject 1 ("operator") creates First secure authenticated channel 4 between First subject 1 and Second subject 2. Using First secure authenticated channel 4, First subject 1 ("operator") creates new Authentication object 5 ("passive validator") on the device of Second subject 2 ("user"). In the aforesaid Authentication object 5, it configures the rights control information for access to Methods 6 of Authentication object 5 by enabling the use of Method 6 of Authentication object 5 for other subjects. Following this, First subject 1 ("operator") also sets Activating information X3 for local activation of the relevant Method 6 of Authentication object 5. First secure authenticated channel 4 is closed.
Re FIG. 4.

By using Local communication 16, Second subject 2 ("user") obtains from the passive element constant Obtained information X4, which contains a parameter and value characterising the required action and its parameters such as identification of the gate e.g. for detecting passing individuals, opening of the gate, validating the ticket, etc. It can use various forms of Local communication 16, e.g. taking a photograph of the printed QR code, wireless communication, audio communication or some other form of optical communication.

Based on Obtained information X4, the device of Second subject 2 ("user") activates the relevant Method 6 of Authentication object 5 ("passive validator").

Using Authentication system 8, Method 6 of Authentication object 5 creates First secure authenticated channel 4 between the device of First subject 1 and the device of Second subject 2 and, where applicable, some other secure channel between the device of Second subject 2 and another Other subject 20 based on the previously set configuration of Authentication object 5 ("passive validator") and based on the content of the Obtained information X4.

If appropriate, Method 6 of Authentication object 5 performs the relevant action together with Information system 11 of First subject 1 or/and together with other devices or systems, for example, records the time and information on the place of validation in the electronic ticket, opens the relevant gate or leaves it closed, records a passing individual, etc.

Example 6—Transfer of Personal Details Among Subjects

It uses the method "Creation and configuration of authentication object" and the method "Protected simultaneous communication between three or more subjects".
Re FIG. 2.

Using Authentication system 8, Second subject 2 ("user"), together with First subject 1 ("identity provider"), creates First secure authenticated channel 4 between First subject 1 and Second subject 2. Using First secure authenticated channel 4, First subject 1 ("identity provider") creates a new Authentication object 5 ("guaranteed identity") on the device of Second subject 2 ("user"). In the aforesaid Authentication object 5, it configures the rights control information for access to Methods 6 ("guaranteed identity") of Authentication object 5 by enabling the use of Method 6 ("pass over personal data") of Authentication object 5 for other subjects ("identity recipients").

At the time when Second subject 2 ("user") is engaged in remote communication with Third subject 3 ("identity recipient") and wishes to enable passing over of personal data previously verified by First subject 1 ("identity provider"), Second secure authenticated channel 7 has already been created or is created using Authentication system 8, the latter consisting of Server part 8a of Authentication system 8 and Client part 8b of Authentication system 8 used between the device of Second subject 2 ("user") and the device of Third subject 3 ("identity recipient"), and, using the aforesaid Second secure authenticated channel 7, Third subject 3 ("identity recipient") requests activation and performance of Method 6 ("transmitted personal data") of Authentication object 5 ("guaranteed identity"), including transmission of the relevant parameters such as a list of the required personal data.

The request for transmission of personal data in the form of request for performing ("transmit personal data") of Method 6 of Authentication object 5 ("guaranteed identity")

is transferred, for example, from Information system 12 of Third subject 3 to Interface 10 of Authentication objects 5 of Third subject 3 and further through the created Second secure authenticated channel 7 between Third subject 3 ("identity recipient") and Second subject 2 ("user") to the device of Second subject 2 ("user").

Second subject 2 ("user") evaluates the configured access rules of Method 6 ("transmit personal data") of Authentication object 5 for a specific Third subject 3 ("identity recipient") and, in case of consistency, continues processing. In case of inconsistency the request for processing is denied by Third subject 3.

If the processing continues, Method 6 ("transmit personal data") of Authentication object 5 ("guaranteed identity") creates, using Authentication system 8, First secure authenticated channel 4 between Second subject 2 ("user") and First subject 1 ("identity provider"), which exists in parallel with Second secure authenticated channel 7 between Second subject 2 ("user") and Third subject 3 ("identity recipient"). Using First secure authenticated channel 4 and Interface 9 of Authentication objects 5 of First subject 1, messages are transferred between Authentication object 5 ("guaranteed identity") and Information system 11 of First subject 1; these messages are required for transmission of the requested personal data including the required confirmations by the user. After successful execution or denial by First subject 1 ("identity provider") or Second subject 2 ("user"), the result and any additional information are transferred using Second secure authenticated channel 7 between Second subject 2 ("user") and Third subject 3 ("identity recipient") e.g. to Information system 12 of Third subject 3.

Example 7—Confirming Payments and Other Transactions

It uses the method "Creation and configuration of authentication object" and the method "Activation of authentication object method by constant local electronic communication".
Re FIG. 1.

Using Authentication system 8, Second subject 2 ("user") together with First subject 1 (e.g. "bank") creates First secure authenticated channel 4 between First subject 1 and Second subject 2. Using First secure authenticated channel 4, First subject 1 ("bank") creates a new Authentication object 5 (e.g. "payment module") on the device of Second subject 2 ("user"). In the aforesaid Authentication object 5 ("payment module"), it configures the rights control information for access to Methods 6 of Authentication object 5 by enabling the use of Method 6 ("pay") of Authentication object 5 for other subjects.
Re FIG. 1+FIG. 4.

Following this, First subject 1 ("bank") also sets Activating information X3 for local activation of the relevant method(s); for example, it sets Activating information X3 for Method 6 ("pay") of Authentication object 5 so that the method is activated using Local communication 16, e.g. by photographing the QR code containing information on payment, a payment slip or cheque, or by pressing the relevant button on the device of Second subject 2 ("user").

Another subject, or First subject 1, creates the relevant Obtained information X4—basic information for making the payment or confirming some other transaction, e.g. displays the QR code on the website of its information system, prints out and sends the payment slip, or prepares a payment order on the basis of a telephone call between Second subject 2 ("user") and the call centre.

Re FIG. 4.

Later, when by using Local communication 16, Second subject 2 ("user") obtains the set Obtained information X4 e.g. by reading the QR code displayed on the screen or printed, photographs a payment slip or presses the relevant button, the device of Second subject 2 ("user"), referring to Obtained information X4, activates the relevant Method 6 ("pay") of Authentication object 5 ("payment module").

Authentication object 5 evaluates the set access rules of Method 6 ("pay") of Authentication object 5 for specific Obtained information X4 and, in case of consistency with Activating information X3 and the configured access rights, processing continues.

If processing continues, Method 6 ("pay") of Authentication object 5, using Authentication system 8, creates First secure authenticated channel 4 between First subject 1 ("bank") and Second subject 2 ("user"), or some other secure channel between Second subject 2 ("user") and some other subject based on the previously set configuration of Authentication object 5 and Obtained information X4.

Using First secure authenticated channel 4 and Interface of Authentication objects 9 of First subject 1, messages are transferred between Authentication object 5 ("payment module") and Information system 11 of First subject 1; these messages are required for entering and confirming the payment, including the required confirmation by the user and cryptographic operations using the previously created cryptographic material.

Other types of transactions are confirmed analogously.

Example 8—Verification of Local Authentication Factor by Another Subject

It uses the method "Creation and configuration of authentication object" and the method "Protected simultaneous communication between three or more subjects".
Re FIG. 1.

The term "local authentication factor" means any manner of confirming ownership of the device of Second subject 2 ("user"), generally referred to as, for example, multi-factor authentication, performed locally using the device of Second subject 2 ("user"), e.g. obtaining and verifying biometric data such as fingerprint, face image, retina image, finger vein recognition, entering secret information such as the PIN, password, activation sequence of images.

Using Authentication system 8, Second subject 2 ("user") together with First subject 1 ("identity provider") creates First secure authenticated channel 4 between the device of First subject 1 ("user") and the device of Second subject 2 (identity provider). Using First secure authenticated channel 4, First subject 1 ("identity provider") creates a new Authentication object 5 ("second factor administration") on the device of Second subject 2 ("user"). In the aforesaid Authentication object 5, it configures the rights control information for access to Methods 6 of Authentication object 5 by enabling the use of Method 6 ("verify second factor") of Authentication object 5 for other subjects ("identity recipient").

Under the conditions determined by First subject 1 ("identity provider"), Second subject 2 ("user") uses the second factor on the device of Second subject 2 ("user") together with the use of Method 6 ("set second factor") of Authentication object 5. Method 6 ("set second factor") of Authentication object 5 using First secure authenticated channel 4 with the use of the known cryptographic methods (e.g. asymmetric cryptography, hash function, zero knowledge proof) uses the device of Second subject 2 ("user") and the device of First subject 1 ("identity provider") to transfer the required information and record cryptographic proof of the second factor used on the device of First subject 1 ("identity provider"). The cryptographic methods used can guarantee that the second factor proof can be used to verify accuracy of the second factor; however, it cannot be used to reconstruct the second factor.

Re FIG. 2

At the time when Second subject 2 ("user") is engaged in remote communication with Third subject 3 ("identity recipient") and wishes to enable verification of accuracy of the second factor previously verified by First subject 1 ("identity provider"), Second secure authenticated channel 7 has already been created or is created using Authentication system 8 between the device of Second subject 2 ("user") and the device of Third subject 3 ("identity recipient"), and using the aforesaid Second secure authenticated channel 7, Third subject 3 ("identity recipient") requests activation and performance Method 6 ("verify second factor") of Authentication object 5 ("second factor administration").

Using the device of Second subject 2 ("user"), Second subject 2 evaluates the set access rules of Method 6 ("verify second factor") of Authentication object 5 ("second factor administration") for specific Third subject 3 ("identity recipient") and, in case of consistency, continues processing. In case of inconsistency, processing of the request is denied.

If the processing continues, Method 6 ("verify second factor") of Authentication object 5 ("second factor administration") creates, using Authentication system 8, First secure authenticated channel 4 between Second subject 2 ("user") and First subject 1 ("identity provider"), which exists in parallel with Second secure authenticated channel 7 between Second subject 2 ("user") and Third subject 3 ("identity recipient"). In the process, Method 6 ("verify second factor") of Authentication object 5 requests the use of the local authentication factor by the device of Second subject 2 ("user"), e.g. by taking a fingerprint or entering secret information. Through the use of the known cryptographic methods (e.g. asymmetric cryptography, hash function, zero knowledge proof) by the device of Second subject 2 ("user") and the device of First subject 1 ("identity provider"), information is transmitted for verifying cryptographic proof of accuracy of the second factor through First secure authenticated channel 4 of the device of First subject 1 ("identity provider"), where the device of First subject 1 ("identity provider") evaluates the aforesaid information using the previously saved cryptographic proof of the used second factor of the device of First subject 1 ("identity provider").

The result of verification of local authentication factor by First subject 1 ("identity provider") is transmitted between First subject 1 ("identity provider") and Third subject 3 ("identity recipient") using First secure authenticated channel 4 and Second secure authenticated channel 7.

Example 9—Creating a Replica

It uses the method "Creation and configuration of authentication object" and the method "Protected communication between two subjects through a third subject with the use of local communication".

Re FIG. 6

The user is equipped with two devices—First user device 21 and Second user device 22. The user wishes to create a replica of First user device 21 on Second user device 22 in a secure manner, i.e. to verify reliably that First user device 21 and Second user device 22 belong to the same user. First user device 21 and Second user device 22 will be reliably distinguishable in electronic communication—they will not be identical.

Using First user device 21, Second subject 2 ("user"), together with First subject 1 ("electronic service provider"), create First secure authenticated channel 4 between First user device 21 and First subject 1 ("electronic service provider") using Authentication system 8. Using First secure authenticated channel 4, First subject 1 ("electronic service provider") creates a new Authentication object 5 ("replica administration") on First user device 21. In the aforesaid Authentication object 5, it sets the rights control information for access to Methods 6 of Authentication object 5 by enabling the use of Method 6 ("use for replica") of Authentication object 5 for First subject 1 ("electronic service provider").

At the time when Second subject 2 ("user") wishes to create a replica of First user device 21 on Second user device 22, Second subject 2 ("user"), using First user device 21 and together with First subject 1 ("electronic service provider"), creates First secure authenticated channel 4 between First user device 21 and First subject 1 ("electronic service provider") using Authentication system 8. Using First secure authenticated channel 4, First subject 1 ("electronic service provider") actives Method 6 ("use for replica") of Authentication object 5 ("replica administration") on First user device 21. Using First secure authenticated channel 4, Object method 6 ("use for replica") creates Replication termination 23 in Interface of Authentication objects 10.

Method 6 ("use for replica") of Authentication object 5 also creates the required Identity information X1 and Security information X2.

Following this, Second subject 2 ("user") locally interconnects First user device 21 with Second user device 22 using Second user device 22 and Local communication 16. Second user device 22 transfers the prepared Identity information X1 and Security information X2 from First user device 21 using Local communication 16.

Using Authentication system 8, Second user device 22, together with First subject 1 ("electronic service provider"), with the use of Identity information X1 ("user"), creates Second secure authenticated channel 7 between Second user device 22 and First subject 1 ("electronic service provider"). Using Second secure authenticated channel 7, First subject 1 ("electronic service provider") creates new Authentication object 5 ("replica administration") on Second user device 22. In the aforesaid Authentication object 5, it configures the rights control information for access to Methods 6 of Authentication object 5 by enabling the use of Method 6 ("create replica") of Authentication object 5 ("replica administration") for First subject 1 ("electronic service provider"). Following this, it actives Method 6 ("create replica") of Authentication object 5 ("replica administration") on Second user device 22.

Method 6 ("create replica") of Authentication object 5 ("replica administration") processes transferred Security information X2 and, using transferred Identity information X1, uses Second secure authenticated channel 7 to connect to Replication termination 23 in Interface of Authentication objects 10 of First subject 1 ("electronic service provider").

As from that time, First user device 21 can engage in two-way communication with Second user device 22 via Replication termination 23 in Interface of Authentication objects 10 of First subject 1 ("electronic service provider") while using First secure authenticated channel 4 and Second secure authenticated channel 7. Therefore, Communication is protected even though the transfer through Common network 13, e.g. using the Internet, may not be secured Since Security information X2 transferred via Local communication 16 is available to Authentication object 5 ("replica administration") on First user device 21 and also Authentication object 5 ("replica administration") on Second user device 22, the communication of First user device 21 with Second user device 22 via Replication termination 23 can be concealed even from First subject 1 ("electronic service provider").

It is also proven from this moment that First user device 21 as well as Second user device 22, communicated between themselves using Local communication 16, which can be deemed as verification that they belong to the same user. First subject 1 marks this in its internal records and the replica is thus created.

The invention claimed is:

1. A method of establishing protected electronic communication, secure transferring and processing of information among three or more subjects, characterised in that
   in the first step, a first secure authenticated channel (4) is created between a first subject
   (1) and a second subject (2) using an authentication system (8), and
      then said channel is used by the first subject (1), in co-operation with the second subject (2), to create an authentication object (5) stored on the second subject (2) and equipped with methods (6) of authentication object (5), whereas the first subject (1) configures methods (6) of authentication object (5) by assigning to each method (6) of the authentication object (5) a rights control information for at least one other subject (3, 20) and optionally also a rights control information for the first subject (1) to use at least one method (6) of the authentication object (5), and then the first secure authenticated channel (4) is closed,
      wherein a second secure authenticated channel (7) between the second subject (2) and a third subject (3) is subsequently created using the authentication system (8), said channel (7) serves to activate the method (6) of the authentication object (5), and said method (6), using the authentication system (8), initiates the creation of the first secure authentication channel (4) between the second subject (2) and the first subject (1) or another subject, whereas the first secure authenticated channel (4) exists in parallel with the second secure authentication channel (7) and both channels are used for the subsequent secured transfer of information among all the subjects.

2. The method according to claim 1, wherein the authentication object (5) contains internal data (X5) for future use.

3. The method according to claim 1, wherein, using the authentication system (8), the method (6) of the authentication object (5) creates two or more secure authenticated channels between the second subject (2) and two or more other subjects (1, 3, 20), whereas said channels exist in parallel with the first secure authenticated channel (4), and all the secure authenticated channels are used together for the subsequent secured transfer of information among all the subjects.

4. The method according to claim 1, wherein the first subject (1) creates a plurality of mutually independent authentication objects (5) equipped with their respective methods (6) of authentication objects (5) for the second subject (2) and a fourth subject (14), and subsequently, the second subject (2) and the first subject (1) to create, using the authentication system (8), the first secure authenticated channel (4) between themselves, which is used to activate the method (6) of the authentication object (5) of the second subject (2), which in co-operation with the first subject (1) prepares an identity information (XI), destined to connect the second subject (2) with the fourth subject (14), as well as a security information (X2) destined for subsequent securing of communication between the second subject (2) and the fourth subject (14), where the identity information (XI) and the security information (X2) (which is known only to the second subject (2)) are transferred from the second subject (2) to the fourth subject (14), and subsequently a fourth secure authenticated channel (17) is created between the first subject (I) and the fourth subject (14) using the authentication system (8) and is interconnected with the first secure authenticated channel (4) using the identity information (XI), and the security information (X2) is used for the subsequent secured transfer of information between the second subject (2) and the fourth subject (14) through the first subject (1).

5. The method according to claim 4, wherein the identity information (XI) and the security information (X2) are transferred from the second subject (2) to the fourth subject (14) using local communication (16).

6. The method according to claim 2, wherein an activating information (X3) for local activation of the method (6) of the authentication object (5) is configured within internal data (X5) for future use by the authentication object (5), on the second subject (2), and said method (6) is subsequently activated by the second subject (2) or using local communication (16) with one or more other devices transferring an obtained information (X4) which corresponds to the activating information (X3) in a pre-selected manner, where, after being activated, the method (6) of the authentication object (5) creates, using internal data (X5) for future use and using the authentication system (8), one or more authenticated data channels (4) which are used for the subsequent secured transfer of information between the second subject (2) and one or more other subjects (20) based on the configuration of the authentication object (5).

7. The method according to claim 6, wherein the method (6) of authentication object (5) uses the obtained information (X4).

* * * * *